United States Patent
Nakanishi et al.

(10) Patent No.: US 12,233,850 B2
(45) Date of Patent: Feb. 25, 2025

(54) CONTROLLER AND CONTROL METHOD FOR HYBRID ELECTRIC VEHICLE

(71) Applicant: TOYOTA JIDOSHA KABUSHIKI KAISHA, Aichi-ken (JP)

(72) Inventors: Naoki Nakanishi, Nagoya (JP); Nobufusa Kobayashi, Okazaki (JP); Masato Yoshikawa, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 245 days.

(21) Appl. No.: 18/170,542

(22) Filed: Feb. 17, 2023

(65) Prior Publication Data
US 2023/0264684 A1  Aug. 24, 2023

(30) Foreign Application Priority Data
Feb. 24, 2022 (JP) .................. 2022-026706

(51) Int. Cl.
*B60W 20/40*  (2016.01)
*B60W 10/02*  (2006.01)
(Continued)

(52) U.S. Cl.
CPC ............ *B60W 20/40* (2013.01); *B60W 10/02* (2013.01); *B60W 10/06* (2013.01); *B60W 10/08* (2013.01);
(Continued)

(58) Field of Classification Search
CPC ...... B60W 20/40; B60W 10/02; B60W 10/06; B60W 10/08; B60W 20/10; B60W 2510/0275; B60W 2510/0638; B60W 2510/1005; B60W 2510/083; B60W 2510/0291; B60W 2540/10; B60W 2540/106; B60W 2710/06
(Continued)

(56) References Cited

U.S. PATENT DOCUMENTS 9,086,045 B2 * 7/2015 Wang .................... B60W 20/40
11,479,237 B2 * 10/2022 Nakano ................. B60W 20/40
(Continued)

FOREIGN PATENT DOCUMENTS

JP  2003-200758 A  7/2003
JP  2005-162081 A  6/2005
(Continued)

*Primary Examiner* — Roger L Pang
(74) *Attorney, Agent, or Firm* — HAUPTMAN HAM, LLP (57) ABSTRACT

A controller is employed in a vehicle including an engine, a motor generator, and a hydraulically-driven clutch. The controller includes a CPU that executes: a first starting process that starts, when starting the engine under a condition in which an increase amount of a torque request value is less than an increase amount determination value, combustion in the engine after increasing an engine rotation speed to a motor rotation speed by engaging the clutch; and a second starting process that starts, when starting the engine under a condition in which the increase amount of the torque request value is greater than or equal to the increase amount determination value, combustion in the engine after the crankshaft starts to be rotated by engaging the clutch, the combustion being started before the engine rotation speed reaches the motor rotation speed.

7 Claims, 4 Drawing Sheets

(51) Int. Cl.
*B60W 10/06* (2006.01)
*B60W 10/08* (2006.01)
*B60W 20/10* (2016.01)

(52) U.S. Cl.
CPC ..... *B60W 20/10* (2013.01); *B60W 2510/0275* (2013.01); *B60W 2510/0638* (2013.01); *B60W 2540/10* (2013.01); *B60W 2710/06* (2013.01)

(58) Field of Classification Search
USPC ........................................ 477/77, 5; 701/113
See application file for complete search history.

(56) References Cited

U.S. PATENT DOCUMENTS

| | | | |
|---|---|---|---|
| 2005/0211479 A1* | 9/2005 | Tamor ................... | B60W 20/00 180/65.25 |
| 2016/0031435 A1* | 2/2016 | Gibson ................... | B60K 6/387 180/65.265 |
| 2016/0090077 A1* | 3/2016 | Choi ..................... | B60W 10/02 701/22 |
| 2021/0300331 A1 | 9/2021 | Nakanishi et al. | |

FOREIGN PATENT DOCUMENTS

| | | |
|---|---|---|
| JP | 201925985 A | 2/2019 |
| JP | 2021-160404 A | 10/2021 |

* cited by examiner

CONTROLLER AND CONTROL METHOD FOR HYBRID ELECTRIC VEHICLE

RELATED APPLICATIONS

The present application claims priority of Japanese Patent Application No. 2022-026706 filed Feb. 24, 2022, the disclosure of which is hereby incorporated by reference herein in its entirety.

BACKGROUND

1. Field

The present disclosure relates to a controller and a control method for a hybrid electric vehicle.

2. Description of Related Art

Japanese Laid-Open Patent Publication No. 2019-25985 discloses a controller employed in a hybrid electric vehicle. The hybrid electric vehicle includes an engine and a motor generator as a power source. The hybrid electric vehicle further includes a clutch between an engine and a motor generator. To start the engine, the controller engages the clutch to couple a crankshaft of the engine to a driving shaft of the motor generator. This allows the crankshaft to be rotated by driving the motor generator. After driving the motor generator so that the crankshaft starts rotating, the controller causes combustion to be started in the engine.

In a case in which combustion is started after the motor generator is driven so that the crankshaft starts rotating as described above, the time of starting combustion may be hastened. Although this allows the engine start to be completed earlier, vibration of the vehicle resulting from the engine start tends to occur. In contrast, when the time of starting combustion is delayed, the occurrence of the vibration resulting from the engine start is limited, but it causes the engine start to be completed later.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To solve the above problem, a first aspect of the present disclosure provides a controller for a hybrid electric vehicle. The hybrid electric vehicle includes an engine and a motor generator as a power source. The engine includes a crankshaft. The motor generator includes a driving shaft. The hybrid electric vehicle further includes a clutch between the crankshaft and the driving shaft. The controller includes circuitry that controls the engine, the motor generator, and the clutch. The circuitry is configured to execute: a first starting process that starts, when starting the engine under a condition in which an increase amount of a torque request value is less than an increase amount determination value, combustion in the engine after increasing an engine rotation speed to a motor rotation speed by engaging the clutch, the torque request value being a request value of torque for the power source, the engine rotation speed being a rotation speed of the crankshaft, and the motor rotation speed being a rotation speed of the driving shaft; and a second starting process that starts, when starting the engine under a condition in which the increase amount of the torque request value is greater than or equal to the increase amount determination value, combustion in the engine after the crankshaft starts to be rotated by engaging the clutch, the combustion being started before the engine rotation speed reaches the motor rotation speed.

To solve the above problem, a second aspect of the present disclosure provides a control method for a hybrid electric vehicle. The hybrid electric vehicle includes an engine and a motor generator as a power source. The engine includes a crankshaft. The motor generator includes a driving shaft. The hybrid electric vehicle further includes a clutch between the crankshaft and the driving shaft. The control method includes: starting, when starting the engine under a condition in which an increase amount of a torque request value is less than an increase amount determination value, combustion in the engine after increasing an engine rotation speed to a motor rotation speed by engaging the clutch, the torque request value being a request value of torque for the power source, the engine rotation speed being a rotation speed of the crankshaft, and the motor rotation speed being a rotation speed of the driving shaft; and starting, when starting the engine under a condition in which the increase amount of the torque request value is greater than or equal to the increase amount determination value, combustion in the engine after the crankshaft starts to be rotated by engaging the clutch, the combustion being started before the engine rotation speed reaches the motor rotation speed.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller 100 for a hybrid electric vehicle 500 according to an embodiment will now be described with reference to FIGS. 1 to 6.

Figure 1:
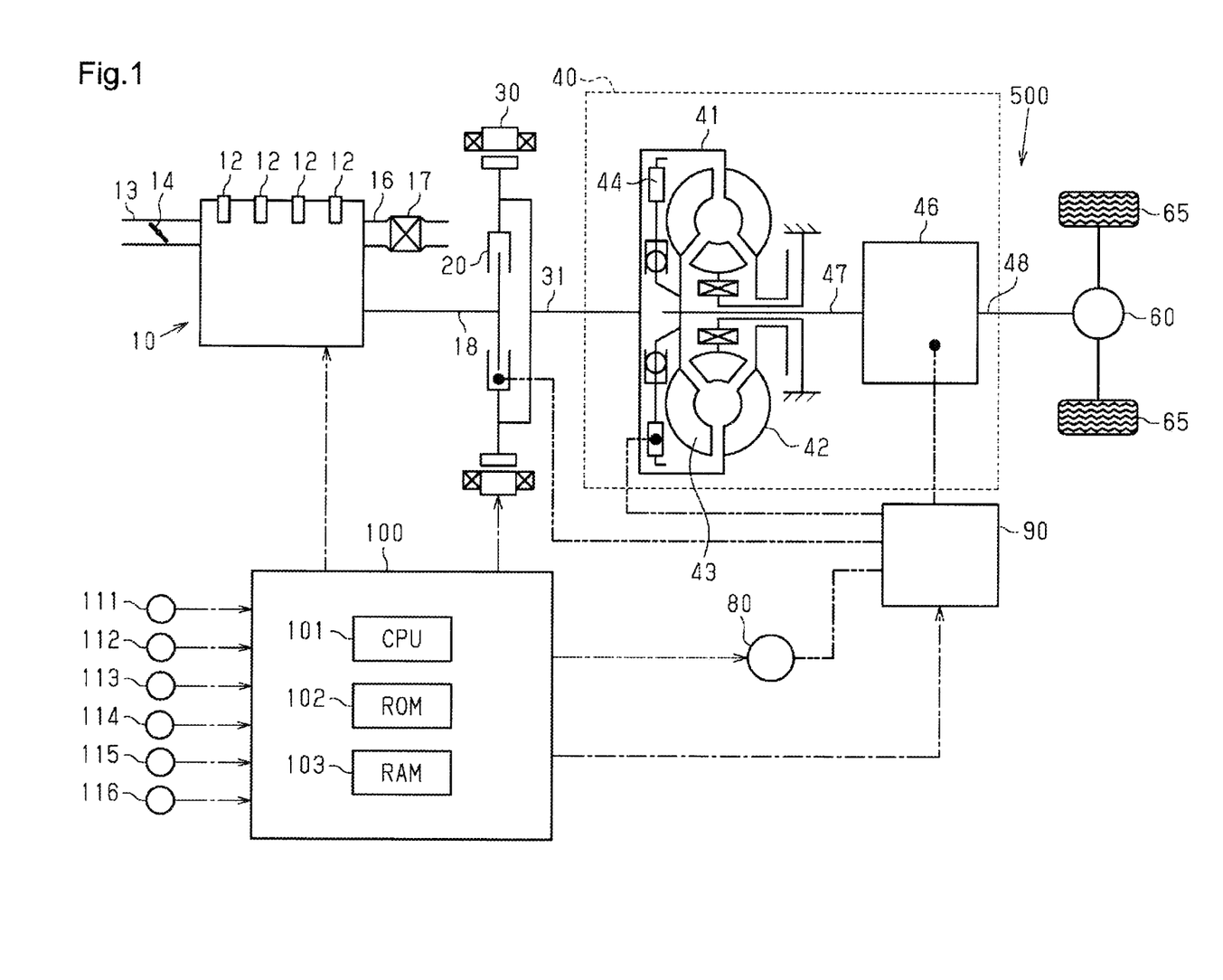
FIG. 1 is a diagram showing the schematic configuration of a hybrid electric vehicle that includes a controller according to an embodiment.

FIG. 1 shows the schematic configuration of the hybrid electric vehicle 500 including the controller 100, which is an example of a controller for a hybrid electric vehicle. The hybrid electric vehicle 500 will be hereinafter simply referred to as the vehicle 500.

Configuration of Vehicle

The vehicle 500 includes an engine 10 and a motor generator 30 as a power source. The vehicle 500 further includes a clutch 20 between the engine 10 and the motor generator 30 on a torque transmission path. Torque output from the engine 10 or the motor generator 30 is transmitted to driven wheels 65 through a transmission 40 and a differential 60. Torque input to the transmission 40 from the power source is referred to as a system shaft torque.

The engine 10 includes fuel injection valves 12, which inject fuel, and cylinders. The engine 10 further includes an intake passage 13, which is connected to the cylinders, and an electronic throttle valve 14, which regulates the amount of air flowing through the intake passage 13. In the cylinders, air-fuel mixture containing the air drawn in from the intake passage 13 and the fuel injected from the fuel injection valves 12 is burned. Burning the air-fuel mixture produces exhaust gas that is discharged from the cylinders to an exhaust passage 16. The exhaust passage 16 includes a catalyst 17 that purifies exhaust gas.

The engine 10 includes a crankshaft 18. The crankshaft 18 is an output shaft of the engine 10. The crankshaft 18 is rotated in a predetermined direction by the force obtained by burning the air-fuel mixture in the cylinders. That is, an engine torque Te, which is an output torque of the engine 10, is output from the crankshaft 18.

The clutch 20 is coupled to the crankshaft 18 of the engine 10. In a state in which the clutch 20 is engaged, torque can be transmitted between the engine 10 and the motor generator 30. In a state in which the clutch 20 is disengaged, torque cannot be transmitted between the engine 10 and the motor generator 30.

In the present embodiment, the engagement of the clutch 20 includes complete engagement and slip engagement. The complete engagement produces a larger engagement force of the clutch 20 than the slip engagement. As the engagement force of the clutch 20 becomes larger, a torque capacity Tc of the clutch 20 becomes larger. Thus, when the clutch 20 is completely engaged, the efficiency of transmitting torque between the engine 10 and the motor generator 30 is relatively high. The slip engagement of the clutch 20 produces a smaller torque capacity Tc of the clutch 20 than the complete engagement of the clutch 20. Thus, when the clutch 20 is slip-engaged, the efficiency of transmitting torque between the engine 10 and the motor generator 30 is relatively low although the torque is transmitted. That is, the clutch 20 may be slip-engaged to intentionally lower the efficiency of transmitting torque between the engine 10 and the motor generator 30.

The clutch 20 is a hydraulically-driven clutch. In such a clutch 20, as a clutch hydraulic pressure Pc, which is the hydraulic pressure supplied to the clutch 20, becomes higher, the engagement force of the clutch 20 becomes larger. That is, adjusting the clutch hydraulic pressure Pc allows for slip engagement of the clutch 20 or complete engagement of the clutch 20. Since the torque capacity Tc of the clutch 20 becomes larger as the clutch hydraulic pressure Pc becomes higher, the efficiency of transmitting torque between the engine 10 and the motor generator 30 becomes higher. That is, in a state in which the clutch 20 is engaged, adjusting the clutch hydraulic pressure Pc changes the torque capacity Tc and consequently adjusts the efficiency of transmitting torque of the clutch 20.

The motor generator 30 includes a driving shaft 31 coupled to the clutch 20. That is, when the motor generator 30 functions as an electric motor, the driving shaft 31 is rotated by the electric power supplied from a battery via an inverter. When the motor generator 30 functions as a power generator, regenerative electric power corresponding to the rotation of the driving shaft 31 is generated in the motor generator 30 so that the regenerative electric power is supplied to the battery via the inverter. The output torque of the motor generator 30 is referred to as a motor torque Tm. The engine torque Te includes torque input to the driving shaft 31 through the clutch 20 from the crankshaft 18 and the motor torque Tm. The sum of that torque and the motor torque Tm is referred to as a system shaft torque Tsys.

The transmission 40 includes a torque converter 41 and a transmission mechanism 46. The torque converter 41 includes a pump impeller 42, a turbine impeller 43, and a lock-up clutch 44. The pump impeller 42 is coupled to the driving shaft 31 of the motor generator 30. The turbine impeller 43 is coupled to the transmission mechanism 46. When the lock-up clutch 44 is disengaged, the hydraulic oil in the torque converter 41 causes torque to be transmitted from the pump impeller 42 to the turbine impeller 43. When the lock-up clutch 44 is engaged, torque is directly transmitted from the pump impeller 42 to the turbine impeller 43 without relying on the hydraulic oil.

The transmission mechanism 46 is, for example, a multi-speed transmission mechanism. The transmission mechanism 46 includes an input shaft 47, to which torque is input from the torque converter 41, and an output shaft 48, which outputs torque. The input shaft 47 is coupled to the turbine impeller 43 of the torque converter 41. The transmission mechanism 46 decelerates the torque input from the input shaft 47 and then outputs the decelerated torque from the output shaft 48 to the differential 60.

In the present embodiment, the vehicle 500 includes an electric pump 80 and a hydraulic control circuit 90. The electric pump 80 pressurizes hydraulic oil and supplies the oil to the hydraulic control circuit 90. The hydraulic control circuit 90 supplies the transmission mechanism 46, the torque converter 41, and the clutch 20 with the high-pressure hydraulic oil that has been supplied from the electric pump 80. For example, the hydraulic control circuit 90 includes oil control valves. By controlling the oil control valves, the supplying and discharging of hydraulic oil to and from a target to be supplied with hydraulic oil is controlled, and the hydraulic pressure of hydraulic oil supplied to a supply target is controlled. That is, the hydraulic control circuit 90 is configured to adjust the clutch hydraulic pressure Pc.

Detection System of Vehicle

The detection system of the vehicle 500 includes sensors that output detection signals corresponding to detection results to the controller 100. That is, the vehicle 500 includes a crank angle sensor 111, an air flow meter 112, an accelerator open degree sensor 113, a motor angle sensor 114, an input shaft sensor 115, and an oil temperature sensor 116. The crank angle sensor 111 outputs a detection signal corresponding to an engine rotation speed Ne, which is the rotation speed of the crankshaft 18. The air flow meter 112 detects an intake air amount GA, which is the amount of air flowing through the intake passage 13, and outputs a detection signal corresponding to the detection result. The accelerator open degree sensor 113 detects an accelerator open degree ACCP, which is the operation amount of the accelerator pedal, and outputs a detection signal corresponding to the detection result. The motor angle sensor 114 outputs a detection signal corresponding to a motor rotation speed Nm, which is the rotation speed of the driving shaft 31 of the motor generator 30. The input shaft sensor 115 outputs a detection signal corresponding to an input shaft rotation speed Nat, which is the rotation speed of the input shaft 47 of the transmission mechanism 46. The oil temperature sensor 116 detects an oil temperature TOIL, which is the temperature of hydraulic oil discharged out of the electric pump 80, and outputs a detection signal corresponding to the detection result.

Controller

The controller 100 includes a CPU 101, a ROM 102, and a RAM 103. The ROM 102 stores various control programs executed by the CPU 101. The RAM 103 stores the results of calculation performed by the CPU 101. The CPU 101 executes the control programs so as to control the engine 10 and the motor generator 30. Further, the CPU 101 controls the electric pump 80 and the hydraulic control circuit 90 so as to control the clutch 20 and the transmission 40. Thus, the CPU 101 corresponds to an execution device in the present embodiment.

The CPU 101 calculates the engine rotation speed Ne based on a detection signal Scr of the crank angle sensor 111. The CPU 101 calculates an engine load factor KL based on the engine rotation speed Ne and the intake air amount GA.

The CPU 101 obtains a torque request value TsR, which is a request value of torque for the power source, based on the accelerator open degree ACCP. The torque request value TsR refers to a request value of torque input to the transmission 40 from the driving shaft 31. For example, the CPU 101 sets the torque request value TsR to be larger as the accelerator open degree ACCP becomes larger. The CPU 101 controls the power source (i.e., the engine 10 and the motor generator 30) based on the torque request value TsR.

Traveling modes of the vehicle 500 include an electric traveling mode and a hybrid traveling mode. Of the engine 10 and the motor generator 30, the electric traveling mode causes only the motor generator 30 to output torque. Thus, when the electric traveling mode is selected, the CPU 101 controls the motor generator 30 based on the torque request value TsR. When the electric traveling mode is selected, the engine 10 is not operated and thus the CPU 101 causes the clutch 20 to be disengaged.

The hybrid traveling mode causes both the engine 10 and the motor generator 30 to output torque. When the engine 10 is operated, the CPU 101 controls the engine 10 and the motor generator 30 based on the torque request value TsR with the clutch 20 engaged. When the hybrid traveling mode is selected, the CPU 101 may intermittently stop the operation of the engine 10. In this case, the CPU 101 controls the motor generator 30 based on the torque request value TsR with the clutch 20 disengaged.

When the operation of the engine 10 is stopped under a condition in which the hybrid traveling mode is selected, the CPU 101 may cause the engine 10 to start operating after the torque request value TsR is increased by, for example, an increase in the accelerator open degree ACCP. In this case, the CPU 101 engages the clutch 20 in addition to starting the engine 10. In the present embodiment, when starting the engine 10, the CPU 101 selects a first starting process or a second starting process and starts the engine 10 by executing the selected process.

Figure 2:
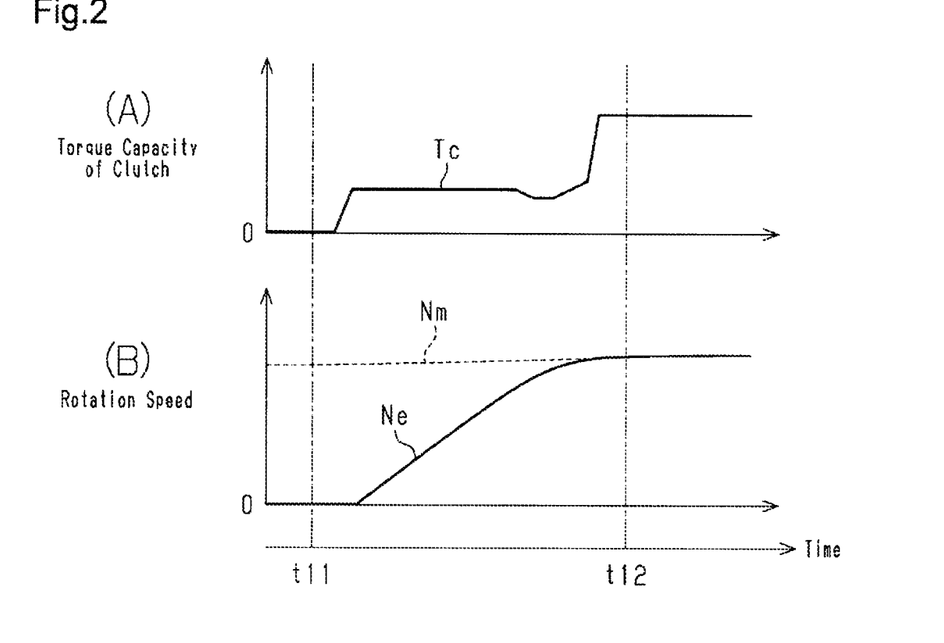
FIG. 2 is a timing diagram in a case in which the engine is started with the first starting process.

The first starting process will now be described with reference to FIG. 2.

In the first starting process, when the starting of the engine 10 is requested at time t11, the clutch 20 is engaged. In this case, the clutch 20 is slip-engaged. The CPU 101 controls the electric pump 80 and the hydraulic control circuit 90 so as to increase the clutch hydraulic pressure Pc, thereby increasing the engagement force of the clutch 20. As the engagement force becomes larger, the torque capacity Tc of the clutch 20 becomes larger as shown in section (A) of FIG. 2. When the clutch 20 is slip-engaged, the motor torque Tm is input to the crankshaft 18. This causes the motor generator 30 to crank the engine 10. Thus, the engine rotation speed Ne becomes higher as shown in section (B) of FIG. 2. Then, the engine rotation speed Ne increases to the motor rotation speed Nm. This increases the clutch hydraulic pressure Pc and thus increases the torque capacity Tc of the clutch 20. As a result, the clutch 20 is completely engaged.

The time at which the engine rotation speed Ne becomes substantially equal to the motor rotation speed Nm is referred to as a synchronization time of the clutch 20. Combustion in the engine 10 is started at the synchronization time of the clutch 20 or at time t12, which is slightly later than the synchronization time. That is, combustion in the engine 10 is started after the clutch 20 is completely engaged.

Figure 3:
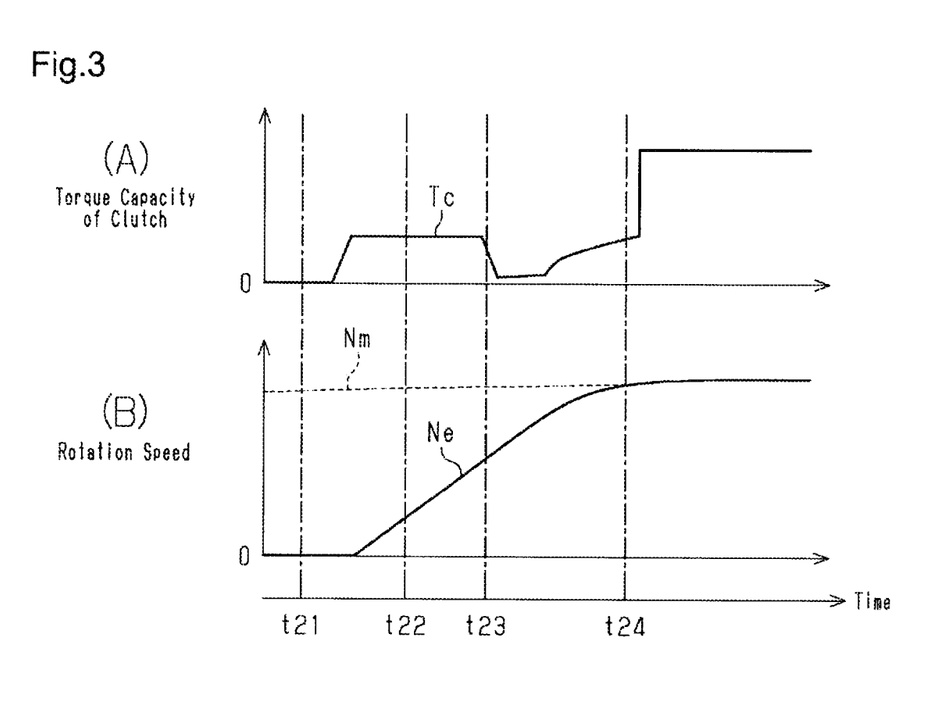
FIG. 3 is a timing diagram in a case in which the engine is started with the second starting process.

The second starting process will now be described with reference to FIG. 3.

In the second starting process, when the starting of the engine 10 is requested at time t21, the clutch 20 is engaged. In this case, the clutch 20 is slip-engaged. The CPU 101 controls the electric pump 80 and the hydraulic control circuit 90 so as to increase the clutch hydraulic pressure Pc, thereby increasing the engagement force of the clutch 20. As the engagement force becomes larger, the torque capacity Tc of the clutch 20 becomes larger as shown in section (A) of FIG. 3. When the clutch 20 is slip-engaged, the motor torque Tm is input to the crankshaft 18. This causes the motor generator 30 to crank the engine 10. Thus, the engine rotation speed Ne becomes higher as shown in section (B) of FIG. 3.

The second starting process is different from the first starting process in that combustion in the engine 10 is started at time t22, which is before the engine rotation speed Ne reaches the motor rotation speed Nm. In the present embodiment, combustion in the engine 10 is started at a time when the crankshaft 18 is rotated once or at a time when the crankshaft 18 is rotated twice by cranking performed by the motor generator 30.

Thus, subsequent to time t22, the engine rotation speed Ne is abruptly increased both by the cranking performed by the motor generator 30 and by an increase in the engine torque Te. Upon start of the engine 10, the torque capacity Tc of the clutch 20 is adjusted before the engine rotation speed Ne reaches the motor rotation speed Nm. That is, the CPU 101 controls the hydraulic control circuit 90 so as to decrease the clutch hydraulic pressure Pc. As a result, the torque capacity Tc of the clutch 20 decreases from time t23. When the torque capacity Tc decreases, the torque transmitted to the driving shaft 31 through the clutch 20 from the crankshaft 18 becomes smaller. This lowers the torque transmission efficiency of the clutch 20. Thus, during the period from when combustion is started in the engine 10 to when the engine rotation speed Ne reaches the motor rotation speed Nm, the torque capacity Tc of the clutch 20 is adjusted so as to adjust the engine torque Te transmitted to the driving shaft 31. This limits an abrupt increase in the motor rotation speed Nm.

At time t24, when the engine rotation speed Ne becomes substantially equal to the motor rotation speed Nm, the CPU 101 controls the hydraulic control circuit 90 so as to increase the clutch hydraulic pressure Pc. As a result, the torque capacity Tc of the clutch 20 increases as shown in section (B) of FIG. 3. This causes the clutch 20 to be completely engaged and thus maximizes the torque transmission efficiency of the clutch 20.

Processes Executed when Starting Engine

The processes executed by the CPU 101 when starting the engine 10 will now be described with reference to FIGS. 4 to 6.

Figure 4:
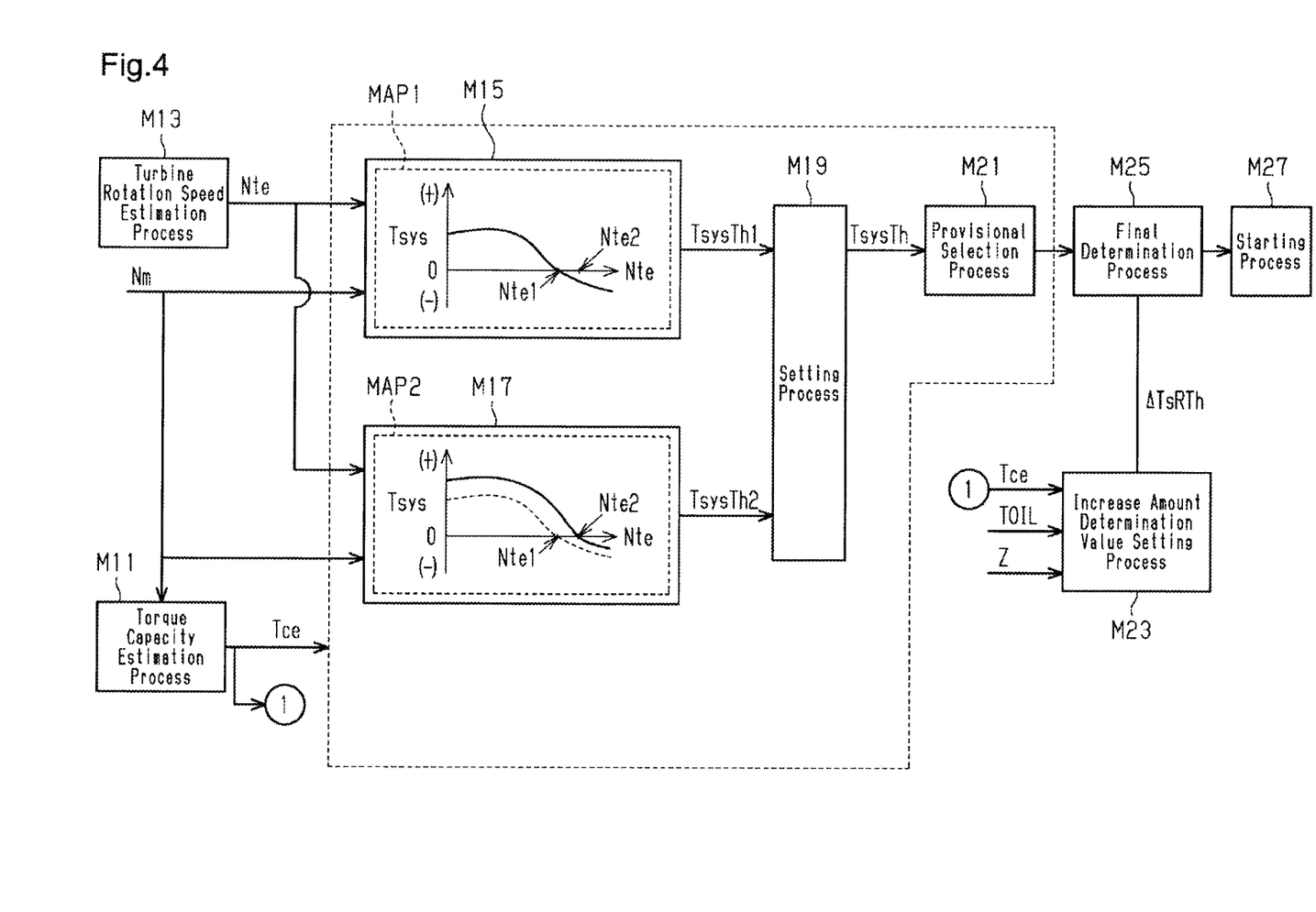
FIG. 4 is a block diagram illustrating multiple processes executed by the CPU of the controller.

As shown in FIG. 4, the CPU 101 executes a torque capacity estimation process M11 and a turbine rotation speed estimation process M13. Further, the CPU 101 executes a first determination value candidate setting process M15, a second determination value candidate setting process M17, a setting process M19, and a provisional selection process M21. Furthermore, the CPU 101 executes an increase amount determination value setting process M23, a final determination process M25, and a starting process M27.

Torque Capacity Estimation Process

The torque capacity estimation process M11 is a process that obtains an estimated torque capacity Tce, which is an estimated value of the torque capacity Tc of the clutch 20. The estimated torque capacity Tce refers to the torque capacity Tc obtained at the synchronization time of the clutch 20 if the engine 10 is started with the second starting process. When starting the engine 10 with the second starting process, the CPU 101 adjusts a command value of the clutch hydraulic pressure Pc in a predefined manner. The manner of response of an actual value of the clutch hydraulic pressure Pc to the variations in the command value can be estimated to a certain extent from the motor rotation speed Nm, the system shaft torque Tsys, and the input shaft rotation speed Nat.

Accordingly, in the torque capacity estimation process M11, the CPU 101 obtains the estimated torque capacity Tce based on the motor rotation speed Nm, the system shaft torque Tsys, and the input shaft rotation speed Nat. For example, it is estimated that the clutch 20 synchronizes later as the motor rotation speed Nm becomes higher. Thus, as the motor rotation speed Nm becomes higher, the CPU 101 sets the estimated torque capacity Tce to be smaller. Further, for example, it is estimated that the clutch 20 synchronizes later as the system shaft torque Tsys becomes larger. Thus, as the system shaft torque Tsys becomes larger, the CPU 101 sets the estimated torque capacity Tce to be smaller. Furthermore, for example, it is estimated that the clutch 20 synchronizes later as the input shaft rotation speed Nat becomes higher. Thus, as the input shaft rotation speed Nat becomes higher, the CPU 101 sets the estimated torque capacity Tce to be smaller.

When the engine 10 is not operating, the clutch 20 is disengaged and thus the CPU 101 obtains the motor torque Tm as the system shaft torque Tsys.

Turbine Rotation Speed Estimation Process

The turbine rotation speed estimation process M13 is a process that obtains an estimated turbine rotation speed Nte, which is an estimated value of the rotation speed of the turbine impeller 43. The rotation speed of the turbine impeller 43 is referred to as the turbine rotation speed. The estimated turbine rotation speed Nte refers to the turbine rotation speed obtained at the synchronization time of the clutch 20 if the engine 10 is started with the second starting process. Since the turbine impeller 43 of the torque converter 41 is coupled to the input shaft 47 of the transmission mechanism 46, the turbine rotation speed is substantially equal to the input shaft rotation speed Nat. That is, the estimated turbine rotation speed Nte is the estimated value of the input shaft rotation speed Nat.

In the turbine rotation speed estimation process M13, the CPU 101 obtains, as the estimated turbine rotation speed Nte, a value obtained by subtracting a deceleration correction value ΔNat from the input shaft rotation speed Nat. The deceleration correction value ΔNat is defined from the particulars of the driving system of the vehicle 500.

First Determination Value Candidate Setting Process

The first determination value candidate setting process M15 refers to a first map MAP1 to obtain a first shaft torque determination value TsysTh1, which is one of the candidate values of a shaft torque determination value. The first map MAP1 shows the relationship between the estimated turbine rotation speed Nte and the system shaft torque Tsys. In the first map MAP1, when the estimated turbine rotation speed Nte is less than a first reference rotation speed Nte1, the system shaft torque Tsys corresponding to the estimated turbine rotation speed Nte has a positive value. Specifically, when the estimated turbine rotation speed Nte is less than the first reference rotation speed Nte1, the system shaft torque Tsys corresponding to the estimated turbine rotation speed Nte becomes larger as the estimated turbine rotation speed Nte becomes lower. When the estimated turbine rotation speed Nte is greater than or equal to the first reference rotation speed Nte1, the system shaft torque Tsys corresponding to the estimated turbine rotation speed Nte has a negative value. Specifically, when the estimated turbine rotation speed Nte is greater than or equal to the first reference rotation speed Nte1, the absolute value of the system shaft torque Tsys corresponding to the estimated turbine rotation speed Nte becomes larger as the estimated turbine rotation speed Nte becomes higher.

In the first determination value candidate setting process M15, the CPU 101 refers to the first map MAP1 to obtain the system shaft torque Tsys corresponding to the estimated turbine rotation speed Nte. Then, the CPU 101 sets, as the first shaft torque determination value TsysTh1, the system shaft torque Tsys obtained with reference to the first map MAP1.

As will be described in detail later, the first map MAP1 is used when the estimated torque capacity Tce is less than a reference torque capacity Tcb. When the system shaft torque Tsys is greater than or equal to the first shaft torque determination value TsysTh1 set with reference to the first map MAP1 in a case in which the estimated torque capacity Tce is less than the reference torque capacity Tcb, the occurrence of vibration caused by starting the engine 10 is limited even if the engine 10 is started with the second starting process.

Second Determination Value Candidate Setting Process

The second determination value candidate setting process M17 refers to a second map MAP2 to obtain a second shaft torque determination value TsysTh2, which is one of the candidate values of the shaft torque determination value. The second map MAP2 shows the relationship between the estimated turbine rotation speed Nte and the system shaft torque Tsys. In the second map MAP2, when the estimated turbine rotation speed Nte is less than a second reference rotation speed Nte2, the system shaft torque Tsys corresponding to the estimated turbine rotation speed Nte has a positive value. Specifically, when the estimated turbine rotation speed Nte is less than the second reference rotation speed Nte2, the system shaft torque Tsys corresponding to the estimated turbine rotation speed Nte becomes larger as the estimated turbine rotation speed Nte becomes lower. When the estimated turbine rotation speed Nte is greater than or equal to the second reference rotation speed Nte2, the system shaft torque Tsys corresponding to the estimated turbine rotation speed Nte has a negative value. Specifically, when the estimated turbine rotation speed Nte is greater than or equal to the second reference rotation speed Nte2, the absolute value of the system shaft torque Tsys corresponding to the estimated turbine rotation speed Nte becomes larger as the estimated turbine rotation speed Nte becomes higher. The value of the second reference rotation speed Nte2 is set to be greater than that of the first reference rotation speed Nte1.

In the second determination value candidate setting process M17, the CPU 101 refers to the second map MAP2 to obtain the system shaft torque Tsys corresponding to the estimated turbine rotation speed Nte. Then, the CPU 101 sets, as the second shaft torque determination value TsysTh2, the system shaft torque Tsys obtained with reference to the second map MAP2.

As will be described in detail later, the second map MAP2 is used when the estimated torque capacity Tce is greater than or equal to the reference torque capacity Tcb. When the system shaft torque Tsys is greater than or equal to the second shaft torque determination value TsysTh2 set with reference to the second map MAP2 in a case in which the estimated torque capacity Tce is greater than or equal to the reference torque capacity Tcb, the occurrence of vibration caused by starting the engine 10 is limited even if the engine 10 is started with the second starting process.

The first shaft torque determination value TsysTh1 is set by the first determination value candidate setting process M15. The second shaft torque determination value TsysTh2 is set by the second determination value candidate setting process M17. The first shaft torque determination value TsysTh1 and the second shaft torque determination value TsysTh2 are both torques corresponding to the estimated turbine rotation speed Nte. In the present embodiment, the first map MAP1 and the second map MAP2 are created such that the second shaft torque determination value TsysTh2 is greater than the first shaft torque determination value TsysTh1. The broken line in the graph illustrating the second map MAP2 indicates the relationship between the estimated turbine rotation speed Nte and the system shaft torque Tsys in the first map MAP1.

Setting Process

The setting process M19 is a process that sets one of the first shaft torque determination value TsysTh1 and the second shaft torque determination value TsysTh2 as a shaft torque determination value TsysTh. In the setting process M19, the CPU 101 sets the shaft torque determination value TsysTh based on the estimated torque capacity Tce. Specifically, when the estimated torque capacity Tce is less than the reference torque capacity Tcb, the CPU 101 sets the first shaft torque determination value TsysTh1 as the shaft torque determination value TsysTh. When the estimated torque capacity Tce is greater than or equal to the reference torque capacity Tcb, the CPU 101 sets the second shaft torque determination value TsysTh2 as the shaft torque determination value TsysTh. Thus, the shaft torque determination value TsysTh is set to be larger when the estimated torque capacity Tce is relatively large than when the estimated torque capacity Tce is relatively small.

Provisional Selection Process

The provisional selection process M21 is a process that provisionally selects one of the first starting process and the second starting process based on the shaft torque determination value TsysTh and the system shaft torque Tsys. In the provisional selection process M21, when the system shaft torque Tsys is less than the shaft torque determination value TsysTh, the CPU 101 provisionally selects the first starting process. When the system shaft torque Tsys is greater than or equal to the shaft torque determination value TsysTh, the CPU 101 selects the second starting process.

Increase Amount Determination Value Setting Process

The increase amount determination value setting process M23 is a process that sets an increase amount determination value $\Delta$TsRTh, which will be described later. In the increase amount determination value setting process M23, the CPU 101 sets the increase amount determination value $\Delta$TsRTh based on the estimated torque capacity Tce, the oil temperature TOIL, and a gear position Z that is selected by the transmission mechanism 46. In the present embodiment, the CPU 101 sets, as the increase amount determination value $\Delta$TsRTh, a value obtained by correcting a reference increase amount determination value $\Delta$TsRThb based on the estimated torque capacity Tce, the oil temperature TOIL, and the gear position Z. The reference increase amount determination value $\Delta$TsRThb is a reference value of the increase amount determination value $\Delta$TsRTh.

The CPU 101 sets a first correction gain G1 to a smaller value as the estimated torque capacity Tce becomes smaller. The CPU 101 sets a second correction gain G2 to a smaller value as the oil temperature TOIL becomes higher. The CPU 101 sets a third correction gain G3 to a smaller value as the gear position Z selected by the transmission mechanism 46 becomes higher. The correction gains G1, G2, G3 are each set to a value greater than 0 and less than or equal to 1. The CPU 101 sets the increase amount determination value $\Delta$TsRTh to a product of the reference increase amount determination value ΔTsRThb, the first correction gain G1, the second correction gain G2, and the third correction gain G3.

Final Determination Process

The final determination process M25 is a process that finally determines the starting process of the engine 10 when the starting of the engine 10 is actually requested.

The final determination process M25 will now be described with reference to FIG. 5. The CPU 101 repeatedly executes the final determination process M25 in a predetermined control cycle.

In step S11, the CPU 101 determines whether a start request for the engine 10 has been made. In a case in which the start request has not been made (S11: NO), the CPU 101 temporarily ends the final determination process M25. In a case in which the start request has been made (S11: YES), the CPU 101 advances the process to step S13. In step S13, the CPU 101 determines whether the first starting process was provisionally selected in the provisional selection process M21. In a case in which the first starting process was provisionally selected (S13: YES), the CPU 101 advances the process to step S15. In a case in which the second starting process was provisionally selected (S13: NO), the CPU 101 advances the process to step S19.

In step S15, the CPU 101 determines whether the motor torque Tm is excessive. In the present embodiment, the CPU 101 obtains a start-time motor torque maximum value, which is the maximum value of the motor torque Tm obtained when the engine 10 is started. More specifically, the CPU 101 uses the torque request value TsR, which is based on the accelerator open degree ACCP, to obtain an estimated value of the system shaft torque used when electric power is most needed to start the engine 10. Subsequently, the CPU 101 obtains, as the start-time motor torque maximum value, the sum of the estimated value of the system shaft torque and a reaction torque of a cranking torque. When the motor generator 30 can output the start-time motor torque maximum value, the CPU 101 determines that the motor torque Tm is excessive. When the motor generator 30 cannot output the start-time motor torque maximum value, the CPU 101 determines that the motor torque Tm is not excessive. When determining that the motor torque Tm is excessive (S15: YES), the CPU 101 advances the process to step S21. When determining that the motor torque Tm is not excessive (S15: NO), the CPU 101 advances the process to step S17.

In step S17, the CPU 101 determines whether an increase amount ΔTsR of the torque request value TsR is greater than or equal to the increase amount determination value ΔTsRTh. When the starting of the engine 10 is requested under a condition in which the driver of the vehicle 500 is operating the accelerator pedal, the CPU 101 refers to an increase amount of the accelerator open degree ACCP to determine whether the increase amount ΔTsR of the torque request value is greater than or equal to the increase amount determination value ΔTsRTh. For example, the CPU 101 refers to an increase amount ΔACCP of the accelerator open degree ACCP in a predetermined period to determine whether the increase amount ΔTsR of the torque request value TsR is greater than or equal to the increase amount determination value ΔTsRTh.

Figure 6:
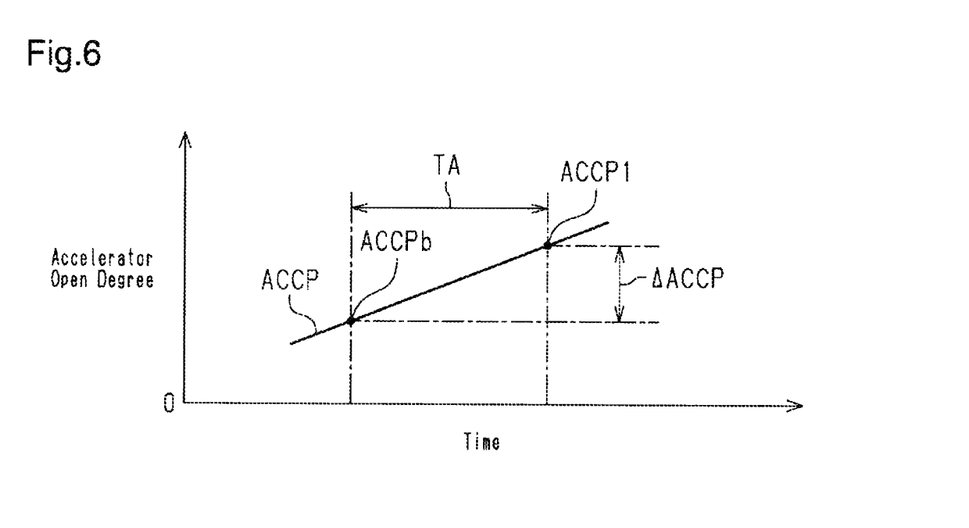
FIG. 6 is a timing diagram illustrating changes in the accelerator open degree.

As shown in FIG. 6, the CPU 101 obtains a current value ACCP1 of the accelerator open degree ACCP and a reference accelerator open degree ACCPb. The reference accelerator open degree ACCPb is an accelerator open degree ACCP at a time prior to the current time by a predetermined time TA. The predetermined time TA is the length of a time of the above predetermined period. The CPU 101 obtains, as the increase amount ΔACCP of the accelerator open degree in the predetermined period, a value obtained by subtracting the reference accelerator open degree ACCPb from the current value ACCP1 of the accelerator open degree. When the increase amount ΔACCP of the accelerator open degree is greater than or equal to an open degree increase amount determination value ΔACCPth, the CPU 101 determines that the increase amount ΔTsR of the torque request value is greater than or equal to the increase amount determination value ΔTsRTh. When the increase amount ΔACCP of the accelerator open degree is less than the open degree increase amount determination value ΔACCPth, the CPU 101 determines that the increase amount ΔTsR of the torque request value is less than the increase amount determination value ΔTsRTh.

In the present embodiment, the increase amount determination value ΔTsRTh varies depending on the estimated torque capacity Tce, the oil temperature TOIL, and the gear position Z. Thus, as the increase amount determination value ΔTsRTh becomes larger, the open degree increase amount determination value ΔACCPth is set to be larger.

Referring back to FIG. 5, when determining that the increase amount ΔTsR of the torque request value is greater than or equal to the increase amount determination value ΔTsRTh (S17: YES), the CPU 101 advances the process to step S19. When determining that the increase amount ΔTsR of the torque request value is less than the increase amount determination value ΔTsRTh (S17: NO), the CPU 101 advances the process to step S21.

In step S19, the CPU 101 determines the second starting process as a process that starts the engine 10. Subsequently, the CPU 101 ends the final determination process M25.

In step S21, the CPU 101 determines the first starting process as a process that starts the engine 10. Subsequently, the CPU 101 ends the final determination process M25.

Starting Process

The starting process M27 is a process that starts the engine 10. The CPU 101 starts the engine 10 with the starting process determined in the final determination process M25. When the starting process determined in the final determination process M25 is the first starting process, the CPU 101 executes the first starting process as the starting process M27. When the starting process determined in the final determination process M25 is the second starting process, the CPU 101 executes the second starting process as the starting process M27.

Operation and Advantage of Present Embodiment

In a case in which the operation of the engine 10 is not operating under the condition in which the hybrid traveling mode is selected, the starting of the engine 10 may be requested when the torque request value TsR is increased by the driver starting to operate the accelerator pedal. The controller 100 executes the first starting process or the second starting process as a process that starts the engine 10.

To start the engine 10 with the first starting process, as described with reference to FIG. 2, the engine rotation speed Ne is increased to the motor rotation speed Nm and then combustion in the engine 10 is started. Thus, variations in the motor rotation speed Nm resulting from the starting of the engine 10 are easily limited by the motor generator 30 or the clutch 20. Starting the engine 10 with the first starting process limits an abrupt change in the motor rotation speed Nm resulting from an abrupt increase in the engine rotation speed Ne. This limits situations in which the vehicle 500 is vibrated due to the starting of the engine 10. However, the combustion in the engine 10 is not started until the engine rotation speed Ne increases to the motor rotation speed Nm. Thus, the completion of the starting of the engine 10 is delayed.

To start the engine 10 with the second starting process, as described with reference to FIG. 3, combustion in the engine 10 is started in a state in which the engine rotation speed Ne is less than the motor rotation speed Nm. Thus, variations in the motor rotation speed Nm resulting from the starting of the engine 10 are not easily limited by the motor generator 30 or the clutch 20. As a result, the starting of the engine 10 easily vibrates the vehicle 500. However, since the engine 10 is started before the engine rotation speed Ne reaches the motor rotation speed Nm, the starting of the engine 10 is completed at a relatively early time.

The reason that the vibration caused by starting the engine 10 is more likely to occur in the vehicle 500 when the second starting process is executed than when the first starting process is executed will now be described in detail. Immediately after combustion starts in the engine 10 (specifically, immediately after first combustion in the engine 10), the variations in the engine torque Te and the torque capacity Tc of the clutch 20 tends to vary an increase rate of the engine rotation speed Ne. If the motor rotation speed Nm is sufficiently high, the variations in the increase rate of the engine rotation speed Ne converge and thus the synchronization time of the clutch 20 does not vary significantly. If the motor rotation speed Nm is relatively low, the variations in the increase rate of the engine rotation speed Ne does not easily converge and thus the synchronization time of the clutch 20 tends to vary. The vibration caused by starting the engine 10 can be reduced using the motor torque Tm. However, there is a response delay of detection of the crank angle sensor 111 and the motor angle sensor 114 and a response delay of the motor torque Tm. Thus, the synchronization time of the clutch 20 needs to be estimated based on the increase rate of the engine rotation speed Ne. In the first starting process, since combustion in the engine 10 is not performed prior to the synchronization time, the increase rate of the engine rotation speed Ne is relatively low and does not vary significantly. This allows the synchronization time of the clutch 20 to be estimated accurately. Accordingly, the occurrence of the vibration caused by starting the engine 10 is limited.

In the second starting process, since the increase rate of the engine rotation speed Ne varies, the synchronization time of the clutch 20 cannot be estimated accurately. Thus, the torque capacity Tc of the clutch 20 is temporarily lowered at time t23 shown in FIG. 3 so as to limit the vibration caused by starting the engine 10. Nevertheless, when the second starting process is executed with a relatively small motor torque Tm, the clutch 20 may synchronize at an earlier time than time t23, at which the torque capacity Tc starts to be lowered. In this case, since the torque capacity Tc is lowered later, the starting of the engine 10 produces vibration.

As the increase amount ΔTsR of the torque request value becomes larger, the acceleration of the vehicle 500 becomes larger. The occupant of the vehicle 500 is less likely to feel annoyed by the occurrence of vibration of the vehicle 500 when the acceleration of the vehicle 500 is relatively large than when the acceleration of the vehicle 500 is relatively small. Combustion in the engine 10 starts at a later time when the engine 10 is started with the first starting process than when the engine 10 is started with the second starting process. Thus, whereas the vibration caused by starting the engine 10 is less likely to increase in the first starting process, the vibration caused by starting the engine 10 is more likely to increase in the second starting process. In a case in which the increase amount ΔTsR of the torque request value is relatively large, it is desired that the starting of the engine 10 be completed at an earlier time to quickly increase the engine torque Te.

In the present embodiment, when the engine 10 is started in a case in which the increase amount ΔTsR of the torque request value is greater than or equal to the increase amount determination value ΔTsRTh, the second starting process is performed to start the engine 10. This allows the starting of the engine 10 to be completed at an earlier time, and makes the occupant less likely to feel annoyed by the vibration of the vehicle 500 resulting from the starting of the engine 10. When the engine 10 is started in a case in which the increase amount ΔTsR of the torque request value is less than the increase amount determination value ΔTsRTh, the first starting process is performed to start the engine 10. In this case, although the completion of the starting of the engine 10 is delayed, the occurrence of the vibration of the vehicle 500 resulting from the starting of the engine 10 is limited.

Accordingly, the controller 100 makes the occupant less likely to feel annoyed when the engine 10 is started. while allowing the starting of the engine 10 to be completed at an earlier time.

The present embodiment further provides the following advantages.

(1) When the increase amount ΔTsR of the torque request value is greater than or equal to the increase amount determination value ΔTsRTh, the second starting process is executed. Thus, the starting of the engine 10 is completed at a relatively early time. That is, the system shaft torque Tsys becomes able to be increased by the engine torque Te at a relatively early time. This limits a response delay of an increase in the system shaft torque Tsys to the torque request value TsR. When the increase amount ΔTsR of the torque request value is less than the increase amount determination value ΔTsRTh, the increase rate of the system shaft torque Tsys does not have to be increased significantly. Thus, the first starting process is performed to start the engine 10. As a result, when there is no request to suddenly accelerate the vehicle 500, the occurrence of vibration caused by starting the engine 10 is limited. Accordingly, when the engine 10 is started, the occupant is less likely to feel annoyed.

(2) In the present embodiment, at a stage in which the starting of the engine 10 is not requested, the first or second starting process is provisionally selected as a process that starts the engine 10. Specifically, when the system shaft torque Tsys is less than the shaft torque determination value TsysTh, the first starting process is provisionally selected. When the system shaft torque Tsys is greater than or equal to the shaft torque determination value TsysTh, the second starting process is provisionally selected.

When the system shaft torque Tsys is greater than or equal to the shaft torque determination value TsysTh, the motor rotation speed Nm is not easily varied by an abrupt increase in the engine rotation speed Ne. That is, the vibration caused by starting the engine 10 is less likely to occur in the vehicle 500.

When the starting of the engine 10 is requested with the second starting process provisionally selected, the engine 10 is started with the second starting process even if the increase amount ΔTsR of the torque request value is less than the increase amount determination value ΔTsRTh. This allows the starting of the engine 10 to be completed at an earlier time while making the occupant less likely to feel annoyed when the engine 10 is started. Additionally, the second starting process can be executed more often.

In a case in which the increase amount ΔTsR of the torque request value is less than the increase amount determination value ΔTsRTh when the starting of the engine 10 is requested with the first starting process provisionally selected, the engine 10 is started with the first starting process. That is, in a case in which the system shaft torque Tsys is relatively small and the vehicle 500 is easily vibrated when the engine 10 is started, the first starting process is executed. Starting the engine 10 with the first starting process limits the occurrence of vibration of the vehicle 500. Accordingly, the occupant is less likely to feel annoyed when the engine 10 is started.

(3) In a case in which the torque capacity Tc of the clutch 20 decreases if the second starting process is performed to start the engine 10, variations in the engine torque Te are easily attenuated by the clutch 20 when the engine torque Te increases abruptly. That is, as the torque capacity Tc decreases if the second starting process is performed to start the engine 10, the vibration caused by starting the engine 10 is less likely to occur in the vehicle 500. Thus, in the present embodiment, the increase amount determination value ΔTsRTh is set to be smaller as the estimated torque capacity Tce, which is an estimated value of the torque capacity obtained if the engine 10 is started with the second starting process, becomes smaller. Thus, the second starting process is easily executed when it is estimated that the torque capacity Tc can be lowered by starting the engine 10 with the second starting process. That is, the present embodiment allows the second starting process to be executed more often while limiting situations in which the vehicle 500 is vibrated when the engine 10 is started.

(4) When the oil temperature TOIL is relatively high and thus the viscosity of hydraulic pressure is relatively low, the clutch hydraulic pressure Pc can be easily adjusted. That is, when an instruction is made to lower the clutch hydraulic pressure Pc, the clutch hydraulic pressure Pc starts to decrease quickly. When the oil temperature TOIL is relatively low and thus the viscosity of hydraulic pressure is relatively high, the clutch hydraulic pressure Pc cannot be easily adjusted. That is, when an instruction is made to lower the clutch hydraulic pressure Pc, the clutch hydraulic pressure Pc has a relatively low responsivity. For example, even if an instruction is made to lower the torque capacity Tc of the clutch 20 at time t23 shown in FIG. 3, the clutch hydraulic pressure Pc starts to decrease at a later time. This causes the engine rotation speed Ne to increase before the torque capacity Tc actually decreases. As a result, the starting of the engine 10 tends to cause vibration.

In the present embodiment, as the oil temperature TOIL becomes higher, the increase amount determination value ΔTsRTh is set to be smaller. Thus, when the oil temperature TOIL is relatively high and the responsivity of the clutch hydraulic pressure Pc is relatively high, the second starting process can be easily executed. That is, the present embodiment allows the second starting process to be executed more often while limiting situations in which the vehicle 500 is vibrated when the engine 10 is started.

(5) The vibration caused by starting the engine 10 is more likely to increase when the selected gear position Z of the transmission mechanism 46 is relatively high than when the selected gear position Z of the transmission mechanism 46 is relatively low. In the present embodiment, as the gear position Z selected by the transmission mechanism 46 becomes higher, the increase amount determination value ΔTsRTh is set to be smaller. This allows the second starting process to be executed more easily as the gear position Z becomes higher. That is, the present embodiment allows the second starting process to be executed more often while limiting situations in which the vehicle 500 is vibrated when the engine 10 is started.

Modifications

The above embodiment may be modified as follows. The above embodiment and the following modifications can be combined as long as the combined modifications remain technically consistent with each other.

The increase amount determination value ΔTsRTh does not have to be varied in correspondence with the gear position Z selected by the transmission mechanism 46. In this case, the vehicle 500 does not have to include a transmission mechanism.

The increase amount determination value ΔTsRTh does not have to be varied in correspondence with the oil temperature TOIL. In this case, the clutch located between the engine 10 and the motor generator 30 may be a clutch that is electromagnetically driven.

The increase amount determination value ΔTsRTh does not have to be varied in correspondence with the estimated torque capacity Tce.

In the above embodiment, the increase amount determination value ΔTsRTh is varied based on the estimated torque capacity Tce, the gear position Z, and the oil temperature TOIL while the length of the predetermined period is fixed. Instead, for example, the increase amount determination value ΔTsRTh may be fixed while the length of the predetermined period may be varied in correspondence with at least one of the parameters: namely, the estimated torque capacity Tce, the gear position Z, and the oil temperature TOIL. For example, as the estimated torque capacity Tce becomes smaller, the length of the predetermined period may be longer. Further, for example, as the gear position Z becomes higher, the length of the predetermined period may be longer. Furthermore, for example, as the oil temperature TOIL becomes higher, the length of the predetermined period may be longer.

When the vehicle 500 functions to autonomously control the vehicle speed, there is a possibility that a controller different from the controller 100 requests the vehicle 500 to accelerate. Examples of the different controller include a controller that controls braking of the vehicle 500 and a controller that generates various commands related to self-driving. In this case, the controller 100 obtains the torque request value TsR based on the request or command from the different controller. Then, the controller 100 uses the increase amount ΔTsR of the torque request value at the request or command to determine whether to execute the first or second starting process.

In the above embodiment, when there is no request for starting the engine 10, the provisional selection process M21 is executed to provisionally select the first or second starting process as a process that starts the engine 10. Instead, the provisional selection process M21 does not have to be executed.

For example, when the starting of the engine 10 is requested, the determination of whether the system shaft torque Tsys is greater than or equal to the shaft torque determination value TsysTh and the determination of whether the increase amount ΔTsR of the torque request value is greater than or equal to the increase amount determination value ΔTsRTh may be made. When at least one of a condition in which the system shaft torque Tsys is greater than or equal to the shaft torque determination value TsysTh and a condition in which the increase amount ΔTsR of the torque request value is greater than or equal to the increase amount determination value ΔTsRTh is satisfied, the second starting process is preferably executed. When neither the condition in which the system shaft torque Tsys is greater than or equal to the shaft torque determination value TsysTh nor the condition in which the increase amount ΔTsR of the torque request value is greater than or equal to the increase amount determination value ΔTsRTh is satisfied, the first starting process is preferably executed.

Further, for example, when the starting of the engine 10 is requested, the determination of whether the increase amount ΔTsR of the torque request value is greater than or equal to the increase amount determination value ΔTsRTh may be made. Then, when the increase amount ΔTsR of the torque request value is greater than or equal to the increase amount determination value ΔTsRTh, the second starting process may be executed. When the increase amount ΔTsR of the torque request value is less than the increase amount determination value ΔTsRTh, the first starting process is executed. In this case, the process to be executed is determined from the first and second starting processes irrespective of how large the system shaft torque Tsys is.

Figure 5:
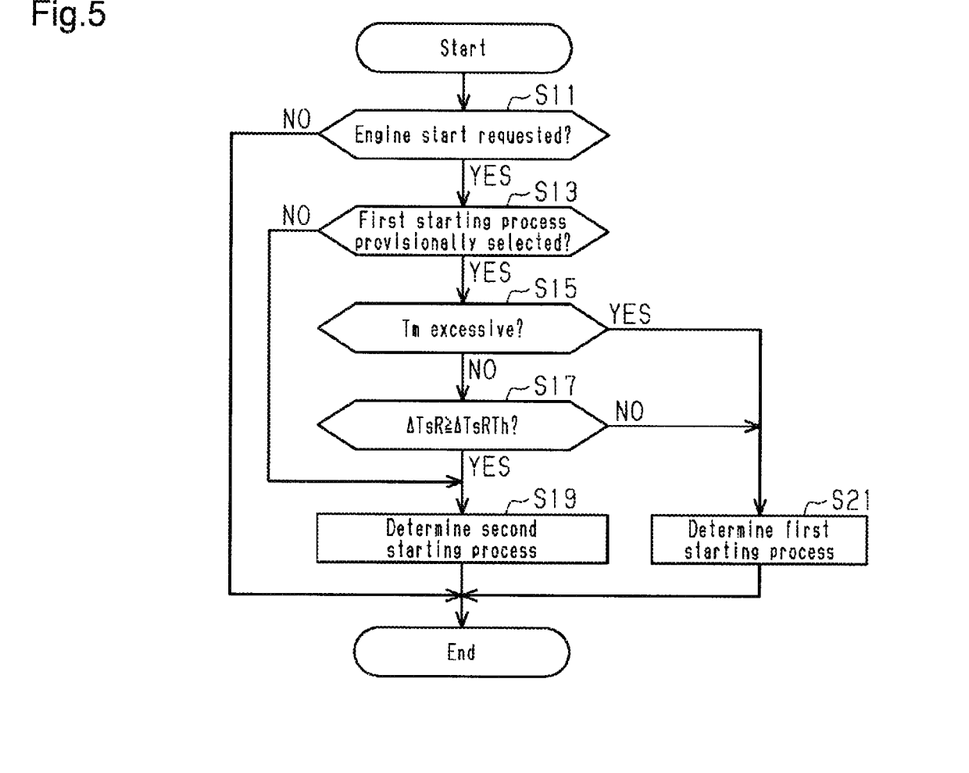
FIG. 5 is a flowchart illustrating a final determination process.

In the final determination process M25 shown in FIG. 5, the determination of step S15 may be omitted.

There may be multiple first maps MAP1 that correspond to the motor rotation speed Nm. In this case, in the first determination value candidate setting process M15, the first map MAP1 corresponding to the present motor rotation speed Nm is selected from the first maps MAP1. By referring to the selected first map MAP1, the system shaft torque Tsys corresponding to the estimated turbine rotation speed Nte is set as the first shaft torque determination value TsysTh1.

There may be multiple second maps MAP2 that correspond to the motor rotation speed Nm. In this case, in the second determination value candidate setting process M17, the second map MAP2 corresponding to the present motor rotation speed Nm is selected from the second maps MAP2. By referring to the selected second map MAP2, the system shaft torque Tsys corresponding to the estimated turbine rotation speed Nte is set as the second shaft torque determination value TsysTh2.

In the above embodiment, the electric pump 80 and the hydraulic control circuit 90, which supply the transmission 40 with hydraulic oil, serve as a system of supplying the clutch 20 with hydraulic pressure. Instead, a device that supplies the clutch 20 with hydraulic pressure may be arranged separately from the electric pump 80 and the hydraulic control circuit 90.

A transmission 40 that does not include the torque converter 41 may be used.

A continuously variable transmission mechanism may be used In this case, the increase amount determination value ΔTsRTh is set in correspondence with the gear ratio of the transmission mechanism.

The controller 100 does not have to include circuitry that includes a CPU and a ROM and that is configured to execute software processing. That is, the controller 100 may be modified as long as it has any one of the following configurations (a) to (c):

(a) The controller 100 includes one or more processors that execute various processes in accordance with a computer program. The processor includes a CPU and a memory, such as a RAM and ROM. The memory stores program codes or instructions configured to cause the CPU to execute the processes. The memory, or computer-readable medium, includes any type of medium that is accessible by general-purpose computers and dedicated computers.

(b) The controller 100 includes one or more dedicated hardware circuits that execute various processes. Examples of the dedicated hardware circuits include an application specific integrated circuit (ASIC) and a field programmable gate array (FPGA).

(c) The controller 100 includes a processor that executes part of various processes in accordance with a computer program and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a hybrid electric vehicle, wherein
the hybrid electric vehicle includes an engine and a motor generator as a power source, the engine including a crankshaft, and the motor generator including a driving shaft,
the hybrid electric vehicle further includes a clutch between the crankshaft and the driving shaft,
the controller comprises circuitry that controls the engine, the motor generator, and the clutch, and
the circuitry is configured to execute:
a first starting process that starts, when starting the engine under a condition in which an increase amount of a torque request value is less than an increase amount determination value, combustion in the engine after increasing an engine rotation speed to a motor rotation speed by engaging the clutch, the torque request value being a request value of torque for the power source, the engine rotation speed being a rotation speed of the crankshaft, and the motor rotation speed being a rotation speed of the driving shaft; and
a second starting process that starts, when starting the engine under a condition in which the increase amount of the torque request value is greater than or equal to the increase amount determination value, combustion in the engine after the crankshaft starts to be rotated by engaging the clutch, the combustion being started before the engine rotation speed reaches the motor rotation speed.

2. The controller according to claim 1, wherein when starting the engine, the circuitry is configured to execute:
the second starting process in a case in which at least one of a condition in which a system shaft torque is greater than or equal to a shaft torque determination value and a condition in which the increase amount of the torque request value is greater than or equal to the increase amount determination value is satisfied, the system shaft torque being a shaft torque of the driving shaft; and the first starting process in a case in which neither the condition in which the system shaft torque is greater than or equal to the shaft torque determination value nor the condition in which the increase amount of the torque request value is greater than or equal to the increase amount determination value is satisfied.

3. The controller according to claim 1, wherein the circuitry is configured to:

execute a provisional selection process that selects the first starting process in a case in which a system shaft torque is less than a shaft torque determination value and selects the second starting process in a case in which the system shaft torque is greater than or equal to the shaft torque determination value, the system shaft torque being a shaft torque of the driving shaft; and in a case in which starting of the engine is requested under a condition in which the first starting process is selected in the provisional selection process, execute the second starting process when the increase amount of the torque request value is greater than or equal to the increase amount determination value and execute the first starting process when the increase amount of the torque request value is less than the increase amount determination value.

4. The controller according to claim 1, wherein the circuitry is configured to set the increase amount determination value to be smaller as an estimated value of a torque capacity of the clutch becomes smaller if the engine is started with the second starting process.

5. The controller according to claim 4, wherein
the clutch of the hybrid electric vehicle is a hydraulically-driven clutch, and the circuitry is configured to set the increase amount determination value to be smaller as a temperature of hydraulic oil of the clutch becomes higher.

6. The controller according to claim 4, wherein
the hybrid electric vehicle includes a transmission,
the motor generator is located between the clutch and the torque transmission path on a torque transmission path, and the circuitry is configured to set the increase amount determination value to be smaller as a gear position selected by the transmission becomes higher.

7. A control method for a hybrid electric vehicle, wherein
the hybrid electric vehicle includes an engine and a motor generator as a power source, the engine including a crankshaft, and the motor generator including a driving shaft, the hybrid electric vehicle further includes a clutch between the crankshaft and the driving shaft,
the control method comprises:

starting, when starting the engine under a condition in which an increase amount of a torque request value is less than an increase amount determination value, combustion in the engine after increasing an engine rotation speed to a motor rotation speed by engaging the clutch, the torque request value being a request value of torque for the power source, the engine rotation speed being a rotation speed of the crankshaft, and the motor rotation speed being a rotation speed of the driving shaft; and starting, when starting the engine under a condition in which the increase amount of the torque request value is greater than or equal to the increase amount determination value, combustion in the engine after the crankshaft starts to be rotated by engaging the clutch, the combustion being started before the engine rotation speed reaches the motor rotation speed.

* * * * *